United States Patent [19]

Maas

[11] Patent Number: 5,332,302
[45] Date of Patent: Jul. 26, 1994

[54] MASTER CYLINDER LOW/HIGH PRESSURE COMBINATION VALVE WHICH OPERATES INDEPENDENTLY OF BRAKE PEDAL POSITION

[75] Inventor: Joachim Maas, Bad Vilbel, Fed. Rep. of Germany

[73] Assignee: Alfred Teves GmbH, Frankfurt am Main, Fed. Rep. of Germany

[21] Appl. No.: 867,715

[22] PCT Filed: Oct. 26, 1991

[86] PCT No.: PCT/EP91/02028

§ 371 Date: Jul. 8, 1992

§ 102(e) Date: Jul. 8, 1992

[87] PCT Pub. No.: WO92/08631

PCT Pub. Date: May 29, 1992

[30] Foreign Application Priority Data

Nov. 12, 1990 [DE] Fed. Rep. of Germany ..... 40359096

[51] Int. Cl.[5] .......................... B60T 8/44; B60T 13/14
[52] U.S. Cl. .............................. 303/114.1; 303/119.2; 60/582; 60/589
[58] Field of Search ............. 188/359; 303/3, 15–17, 303/10, 92, 93, 113.3, 114.1, 61–63, 119.2; 60/582, 584, 589, 591

[56] References Cited

U.S. PATENT DOCUMENTS

| | | | |
|---|---|---|---|
| 3,473,850 | 10/1969 | Lawrie | 303/99 |
| 4,489,555 | 12/1984 | Leiber | 303/92 X |
| 4,620,750 | 11/1986 | Leiber | 303/113.4 |
| 4,705,324 | 11/1987 | Kervagoret | 303/119.2 |
| 4,793,660 | 12/1988 | Becker et al. | 303/114.1 X |
| 5,172,964 | 12/1992 | Levrai et al. | 303/114.1 |

*Primary Examiner*—Robert J. Oberleitner
*Assistant Examiner*—Josie A. Ballato
*Attorney, Agent, or Firm*—Robert P. Seitter; J. Gordon Lewis

[57] ABSTRACT

A brake pressure control device (1) is described in which a low-pressure valve (19) and a high-pressure valve (29) are both actuatable by a brake pedal, resulting in a brake circuit (36) being connectible alternatively either to a reservoir (23) or to a pressure source (33, 34) by releasing or depressing the brake pedal. In order to allow control of the brake pressure by an electronic control, a valve piston (17) operating the high and low pressure valves (19, 29) is movable by an electromagnet (15) independently of the actuating position of the brake pedal, into a position in which the brake circuit (36) is connected to the reservoir (23) and the connection to the pressure source (33, 34) is closed.

12 Claims, 1 Drawing Sheet

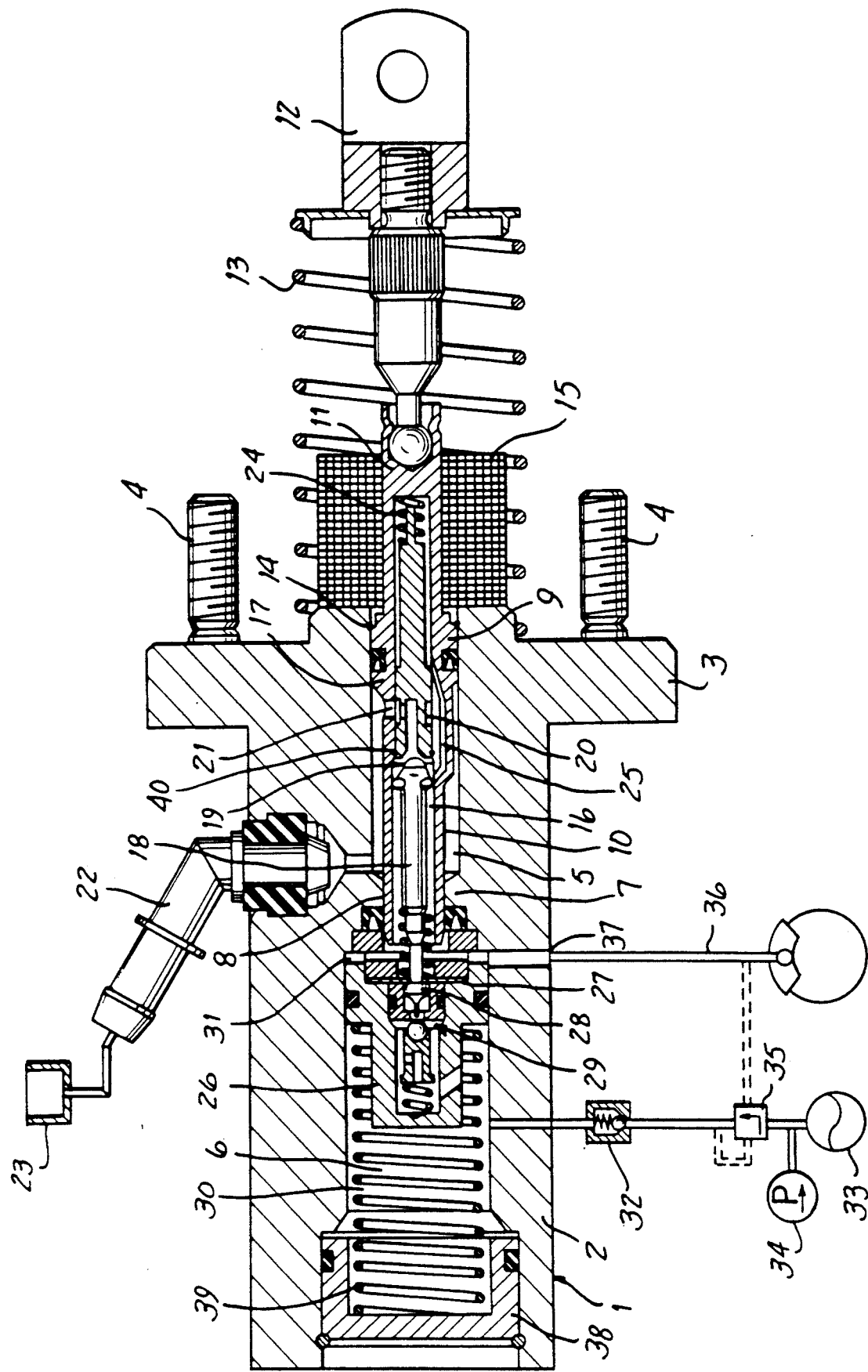

MASTER CYLINDER LOW/HIGH PRESSURE COMBINATION VALVE WHICH OPERATES INDEPENDENTLY OF BRAKE PEDAL POSITION

BACKGROUND OF THE INVENTION

The invention is related to a brake pressure control device for a hydraulic vehicle brake unit with a valve arrangement being actuatable by a brake pedal by means of which a hydraulic fluid outlet for the connection of a brake circuit is connectible alternately either to a reservoir or to a pressure source.

An example of brake pressure control device of this type is shown in U.S. Pat. No. 4,705,324. Such brake pressure control devices supply pressurized hydraulic fluid from a pressure source, such as a pump or pressure accumulator in a controlled manner to one or more brake circuits, depending on an actuating force exerted on a brake pedal in order to generate a braking effect at the brakes of a vehicle which is proportional to the actuating force. Brake pressure control devices of this kind are frequently employed in brake units which are equipped with a brake slip control by which the locking of the vehicle wheels during a braking action is prevented. In the prior-art brake pressure control devices, solenoid valves are provided for achieving a brake slip control which are actuated by an electronic anti-locking device in order to separate the brake circuit from the hydraulic fluid outlet and to connect it to the reservoir and in this way to attain a pressure reduction in the brake circuit. By switching the solenoid valves back into the starting position, the brake circuit is connected again to the hydraulic fluid outlet of the brake pressure control valve for a pressure build-up.

It is the object of the present invention to create a brake pressure control device of the type described which affords a control of the brake pressure by an electronic control device without the necessity of additional solenoid valves.

SUMMARY OF THE INVENTION

According to the invention, this object is achieved in that, independently of the actuating position of the brake pedal, a low and high pressure combination valve is operable by an electromagnetic actuator shifting a valve piston into a position in which the hydraulic fluid connection is connected to the reservoir. In the inventive brake pressure control device, the pressure reduction in the brake circuit is attained by an actuation of the valve combination notwithstanding the brake pedal position, and being brought about by energization of an electromagnet controlled by an electronic brake slip control. No additional control valve is therefore required. This affords a considerable simplification and reduction of the manufacturing cost of the brake unit. Moreover, the safety of the unit is increased since an additional valve sealing point in the brake circuit is eliminated.

In the preferred embodiment of the invention, it is envisaged that between the valve combination and the brake pedal a spring is positioned for the normal transmission of a brake pedal actuating force, but the spring is compressible by the electromagnetic actuator to reverse the operation of the valve combination despite the continued exertion of the brake pedal actuating force. This arrangement simplifies the brake pressure control system because in case of an electromagnetic actuation of the valve arrangement, the force of the brake pedal applied to the valve combination need not be interrupted.

According to the invention, the brake pedal is connected to an actuating piston which projects out of the housing of the brake pressure control device and which contains in a bore formed therein, a valve piston drivingly engaged by the actuating piston through an interposed compression spring so as to be movable with the actuation piston. The actuating piston is surrounded by an electromagnet by which the valve piston is movable in a reverse direction, compressing the spring. The actuating piston also provides an alternate means for creating a hydraulic pressure in addition to the actuation of the valve combination, by which means an emergency actuation of the brake circuit in the event of a failure of the fluid pressure supply is possible.

This feature is provided in that the actuating piston is movable into a pressure chamber which is connected to the hydraulic fluid outlet to the brake and also connected to the pressure source through a non-return valve shutting off in the direction of the pressure source. The high-pressure valve of the valve combination permitting the supply of hydraulic fluid to the hydraulic fluid outlet is positioned in a separating piston which is maintained by a compression spring in a final position juxtaposed to the actuating piston and which is movable into the pressure chamber jointly with the actuating piston when the high-pressure valve is open.

According to the invention, the valve piston is pressure-balanced, and as a result, the valve actuating force remains independent of system pressure.

DESCRIPTION OF THE DRAWING

The FIGURE is a view of a longitudinal section through a brake pressure control valve arrangement according to the invention with a diagrammatic representation of the basic components of a brake unit connected to the brake pressure control device.

DETAILED DESCRIPTION

The illustrated brake pressure control device 1 is comprised of a housing 2 with a mounting flange 3 being provided with threaded studs 4 by means of which housing 2 may be mounted to the body of a vehicle. The housing 2 is furnished with two coaxial cylinder bores 5, 6 spaced apart in the longitudinal direction, which are separated from each other by a wall section 7. The wall section 7 is formed with a coaxial through bore 8 whose diameter is smaller than the diameter of either of the cylinder bores 5, 6.

An actuating piston 9 is located in cylinder bore 5 with a piston portion 10 received in bore 8 and with a cylindrical extension 11 which projects out of the cylinder bore 5. An actuating rod 12 is fixed to the end of extension 11 with the aid of a spherical joint connected to a brake pedal shown diagrammatically at 42. By a compression spring 13 which engages a spring retainer cup positioned on the actuating rod 12, the actuating piston 9 is urged against a stop ring 14 which is provided within the cylinder bore 5. The extension 11 is surrounded by an electromagnet 15 which is fastened to the housing 2 in front of the opening of the cylinder bore 5.

The actuating piston 9 is formed with a central bore 16, within which a valve piston 17 and a valve tappet 18 are positioned one behind the other. The end of the valve piston 17 adjacent the valve tappet 18 is furnished with a ring-shaped valve seat which is closable by a valve ball being fixed to the valve tappet 18. In this way, valve piston 17 and valve tappet 18 jointly form a low-pressure valve 19. Low-pressure valve 19 is connected by bores within the valve piston 17 to an annular groove 20 located between two lands of the valve piston 17 which are thereby sealed off with respect to the longitudinal bore 16. The annular groove 20 is connected through a radial bore 21 in the actuating piston 9 to the cylinder bore 5 which latter is connected with a reservoir 23 through a low-pressure connection 22.

The end of the valve piston 17 facing away from the valve tappet 18 extends up into the extension 11 of the actuating piston 9 and forms an armature on which a magnetic force directed toward the actuating rod 12 becomes effective when the electromagnet 15 is energized.

A compression spring 24 is positioned between the end of the valve piston 17 and the bottom of longitudinal bore 16. Through a duct 25 in the wall of the actuating piston 9, the section of the longitudinal bore 16 which contains the compression spring 24 is connected to the front range of the longitudinal bore 16 which contains the valve tappet 18, so that valve piston 17 is pressure-balanced. A retaining ring 40 retains the valve piston 17 at a slight distance from the valve ball of the valve tappet 18.

The end of the valve tappet 18 which faces away from the low-pressure valve 19, is axially slidingly retained within a separating piston 26 which is positioned within cylinder bore 6. For this purpose, the separating piston 26 is furnished with a stop disc 27. The head 28 of the valve tappet 18 is urged against the stop disc 27 by a compression spring surrounding valve tappet 18 and compressed between the stop disc 27 and a shoulder on the valve tappet 18. Formed on the head 28 is a needle-type tappet. A closing element comprised of a ball is disposed within the separating piston 26. The bore may be moved into the open position by the needle tappet.

In its open position, the high-pressure valve 29 connects the regions of the cylinder bore 6 which are separated from each other by the separating piston 26, which regions form an inlet chamber 30 and an outlet chamber 31. Through a non-return valve 32, the inlet chamber 30 is connected to an accumulator 33 and to the delivery side of a pump 34. Between the non-return valve 32 and the accumulator 33 and pump 34, a pressure reducing valve 35 is inserted which limits the pressure within the inlet chamber 30 to a pre-established value which is set to be higher than the pressure in a brake circuit 36 by a predetermined amount. The brake circuit 36 is connected to a hydraulic fluid outlet 37 of the outlet chamber 31.

Between the separating piston 26 and a cover piece 38 closing the cylinder bore 6, a compression spring 39 is interposed, which maintains the separating piston 26 in abutment against the wall section 7.

In the drawing, the brake pressure control device 1 is shown in the position of rest in which the brakes connected to the brake circuit 36 are not actuated. In this position, low-pressure valve 19 is open, so that said brake circuit 36 is connected, through the outlet chamber 31, the longitudinal bore 16, the radial bore 21, the cylinder bore 5, and the low-pressure connection 22, to the reservoir 23. The high-pressure valve 29 is closed and the pressure controlled by the pressure reducing valve 35, which amounts to approximately 30 bar, prevails in the inlet chamber 30.

In order to initiate a braking action, the actuating piston 9 will be moved into the cylinder bore 5. This movement will be transmitted through the compression spring 24 also to the valve piston 17, and also as a result the low-pressure valve 19 will be closed and the outlet chamber 31 will be isolated from the reservoir 23. Upon the closure of the low-pressure valve 19, the motion of the actuating piston 9 will be transmitted also to the tappet 18, so that as the actuating rod advances further, the high-pressure valve 29 will be opened. As a result, pressurized hydraulic fluid will be conveyed from inlet chamber 30 into outlet chamber 31 and will bring about a pressure rise within the latter as well as in the associated brake circuit 36 by which the brakes will be actuated.

Due to the control function of the pressure reducing valve 35, the pressure in the inlet chamber 30, too, will be increased in accordance with the pressure rise in the brake circuit 36, so that the pressure differential of approximately 30 bar which existed at the beginning of actuation will be maintained.

The pressure in the outlet chamber 31 is exerted also on the cross-sectional surface of the actuating piston 9 being sealed off within the bore 8 and will generate a force of reaction which is directed against the actuating rod 12 and which will make the actuation felt at the brake pedal. If and when the desired brake pressure is reached in the brake circuit 36, then due to the force of reaction, the actuating piston 9 will be moved back in the direction of the actuating rod 12 for a distance which suffices to close the high-pressure valve 29. The pressure prevailing within the outlet chamber 31 and in the brake circuit 36 will then remain constant as long as an equilibrium is maintained between the force of reaction and the actuating force.

If and when in the course of a braking action, the electromagnet 15 is energized by a voltage due to a brake slip control co-acting with the brake pressure control device 1, then the valve piston 17 will be moved in the direction of the actuating rod 12 countering the force of the compression spring 24 and the low-pressure valve 19 will be opened, and the valve tappet 18 will be released to close the high pressure valve 29, unless the high pressure valve 29 was previously closed by the actuation piston 9 reaching equilibrium with the reaction force, in which case the high-pressure valve 29 will remain closed.

As a result, hydraulic fluid will be allowed to flow out of the brake circuit 36 to the reservoir 23, whereby a reduction of the pressure will take place in brake circuit 36.

Since during this period, the force of reaction decreases, the actuating piston 9 will slide to the left until it will come to be abutted against the separating piston 26 which latter supports the actuating force. As soon as the current is switched off again at the electromagnet 15, the valve piston 17 will be slid in the direction of actuation again by the compression spring 24, as a result whereof first the low-pressure valve 19 will be closed and subsequently the high-pressure valve 29 will be opened again. Due to this, hydraulic fluid will be allowed to flow into the brake circuit 36 again, whereby the brake pressure will rise again to the level which is pre-established by the actuating force. By an intermittent actuation of the electromagnet 15, an automatic control of the brake pressure in the brake circuit 36 can be brought about in this way without any additional valves.

If due to a defect, the supply of pressurized hydraulic fluid to the brake pressure control device 1 by the accumulator 33 or by the pump 34 should come to be lacking, then a pressure build-up may be brought about in the brake circuit 36 with the aid of the actuating piston 9. For this purpose, the actuating piston 9 will be slid in the direction of actuation beyond the position required to open the high-pressure valve 29, whereby it will come to be abutted against the separating piston 26 and will slide the latter, too, against the force of the compression spring 39. Due to the blocking action of the non-return valve 32, the volume of hydraulic fluid which has been displaced by the actuating piston 9 when the latter penetrates into the outlet chamber 31, may only be conveyed into the brake circuit 36 and will bring about there the build-up of a brake pressure which is sufficient to actuate the brake. The slide of the separating piston 26 is here not significant since the high-pressure valve 29 is kept constantly open, connecting the inlet chamber 30 to the outlet chamber 31.

I claim:

1. A brake pressure control for a brake circuit of a hydraulic vehicle brake system comprising: a housing; a high pressure valve and a low pressure valve combination disposed in said housing; an actuator rod adapted to be advanced by a brake pedal from a rest position; an actuator piston slidably mounted in said housing adapted to be engaged at one end by said actuator rod to be advanced in an actuation direction; a hydraulic fluid outlet connected to said brake circuit; an unpressurized reservoir; a pressure source; said high pressure valve when opened connecting said fluid outlet to said pressure source; said low pressure valve when open connecting said unpressurized reservoir to said hydraulic fluid outlet; a valve piston, and means carrying said valve piston within said actuator piston as said actuator piston is advanced by said actuator rod, said means allowing relative movement of said valve piston in said actuator piston in a direction opposite to said actuation direction of movement of said actuator piston upon application of a predetermined force to said valve piston; means causing said low pressure valve to be closed and said high pressure valve to be successively opened as said valve piston moves with said actuator piston in said actuation direction; electromagnetic means energizable to exert a force on said valve piston effective to move said valve piston within said actuator piston independently of the actuating position of said actuator rod to open said low pressure valve and cause said hydraulic fluid outlet to be connected to said reservoir.

2. A brake pressure control device as claimed in claim 1, wherein said means carrying said valve piston within said actuator piston includes a spring positioned to push said valve piston by said actuator piston in said actuation direction, said spring compressible by said electromagnetic means.

3. A brake pressure control device as claimed in claim 1 wherein said actuator piston is formed with a bore said valve piston slidable in said bore of said actuator piston, a compression spring in said bore interposed between said actuator piston and one end of said valve piston adjacent to said actuator rod, said actuator piston surrounded by an electromagnet included in said electromagnetic means, said electromagnet energizable, said valve piston moved against the force of said compression spring in a direction opposite to said actuation direction by said electromagnet when said electromagnet is energized.

4. A brake pressure control device as claimed in claim 3, further including an inlet chamber and an outlet chamber defined in said housing, said inlet chamber connected to said pressure source through a one way acting valve opening in the direction of said inlet chamber, said outlet chamber provided with said hydraulic fluid outlet, said high pressure valve when opened communicating said inlet chamber with said outlet chamber, said actuator piston movable into said outlet chamber by continued advance of said actuator piston after opening of said high pressure valve causing hydraulic fluid to be forced out of said hydraulic fluid outlet.

5. A brake pressure control device as claimed in claim 3 wherein said valve piston is pressure-balanced.

6. A brake pressure control device according to claim 3 wherein said low pressure valve comprises a low pressure valve seat formed on the other end of said valve piston and a valve tappet slidably disposed in said bore within said actuator piston having one end carrying a valve element movable onto said low pressure valve seat, a fluid connection between said valve seat and said reservoir; means locating said actuator piston in a defined retracted position with said valve tappet and said valve piston separated from each other with said actuator rod in said rest position.

7. The brake pressure control device according to claim 6 wherein said high pressure valve includes a closure element and a spring urging said closure element onto a high pressure valve seat also included in said high pressure valve, and wherein said valve tappet other end moves said closure element off said high pressure valve seat upon continued advance of said valve piston after seating of said valve closure element onto said low pressure valve seat.

8. The brake pressure control device according to claim 7 wherein said tappet is spring urged in a direction opposite said actuation direction into an axially located position independent of the position of said actuator piston.

9. The brake pressure control device according to claim 7 wherein said valve tappet is spring urged away from said closure element whereby upon movement of said valve piston away from said valve tappet by energization of said electromagnetic means, said valve tappet moves away from said closure element to close said high pressure valve.

10. A brake pressure control device as claimed in claim 1 further including a movable separating piston separating said inlet chamber from said outlet chamber, said high pressure valve positioned within said separating piston; a compression spring urging said separating piston to a position adjacent to one end of said actuator piston, said separating piston movable towards said pressure chamber together with said actuator piston when said high pressure valve is open.

11. The brake pressure control device according to claim 1 further including means exerting the pressure communicated to said brake circuit by said high pressure valve on the other end of said actuator piston to create a reaction force from said actuation of said actuator piston, said exerting means causing said reaction force to create an equilibrium with an applied actuation force with said low pressure valve thereupon closed by return movement of said actuator piston.

12. A brake pressure control device in combination with an automotive hydraulic braking system including at least one wheel brake, a pressure source, an unpressurized reservoir, an actuator rod movable from a rest position to actuate said brake system, said brake pressure control device including:
- a high pressure valve and means connecting said pressure source with said wheel brake when said high pressure valve is opened;
- a low pressure valve and means connecting said reservoir with said wheel brake when said low pressure valve is opened;
- manual operator means operatively associated with said actuator rod and said high pressure valve and said low pressure valve including means causing said high pressure valve to be closed and said low pressure valve to be opened with said actuator rod in said rest position, said manual operating means causing said low pressure valve to be closed and thereafter said high pressure valve to be opened as said actuator rod is advanced from said rest position to cause wheel brake actuation; and,
- controllably operated means causing said high pressure valve to be closed and said low pressure valve to be opened notwithstanding the position of said actuator rod, whereby said brake is controllably released regardless of the position of said actuator rod.

* * * * *